United States Patent
Anada et al.

(10) Patent No.: US 8,124,277 B2
(45) Date of Patent: Feb. 28, 2012

(54) BINDER FOR ELECTRODE FORMATION, SLURRY FOR ELECTRODE FORMATION USING THE BINDER, ELECTRODE USING THE SLURRY, RECHARGEABLE BATTERY USING THE ELECTRODE, AND CAPACITOR USING THE ELECTRODE

(75) Inventors: Arihiro Anada, Uji (JP); Kenjin Shiba, Uji (JP); Satoshi Nishitani, Uji (JP)

(73) Assignee: Unitika Ltd., Hyogo (JP)

( * ) Notice: Subject to any disclaimer, the term of this patent is extended or adjusted under 35 U.S.C. 154(b) by 414 days.

(21) Appl. No.: 12/310,435

(22) PCT Filed: Aug. 28, 2007

(86) PCT No.: PCT/JP2007/000919
§ 371 (c)(1),
(2), (4) Date: Feb. 24, 2009

(87) PCT Pub. No.: WO2008/029502
PCT Pub. Date: Mar. 13, 2008

(65) Prior Publication Data
US 2009/0325069 A1 Dec. 31, 2009

(30) Foreign Application Priority Data
Aug. 29, 2006 (JP) .................................. 2006-232726

(51) Int. Cl.
*H01M 4/13* (2010.01)

(52) U.S. Cl. ........ 429/217; 429/122; 429/212; 524/556; 524/549; 361/502

(58) Field of Classification Search .................... 429/217
See application file for complete search history.

(56) References Cited

FOREIGN PATENT DOCUMENTS

| JP | 11-25989 | | 1/1999 |
|---|---|---|---|
| JP | 11025989 A | * | 1/1999 |
| JP | 11-60834 | | 3/1999 |
| JP | 11-162794 | | 6/1999 |
| JP | 11162794 A | * | 6/1999 |
| JP | 2000-173621 | | 6/2000 |
| JP | 2003-151554 | | 5/2003 |
| JP | 2003151554 A | * | 5/2003 |
| JP | 2005-63735 | | 3/2005 |

* cited by examiner

*Primary Examiner* — Barbara Gilliam
*Assistant Examiner* — Gary Harris
(74) *Attorney, Agent, or Firm* — Fildes & Outland, P.C.

(57) ABSTRACT

Disclosed is a binder for electrode formation, which is obtained by dispersing a polyolefin resin containing 50 to 98% by mass of an unsaturated hydrocarbon having 3 to 6 carbon atoms and 0.5 to 20% by mass of an unsaturated carboxylic acid unit in an aqueous medium together with a basic compound. This binder for electrode formation is also characterized in that the content of a nonvolatile water-compatibilizing agent is 5 parts by mass or less per 100 parts by mass of the polyolefin resin.

10 Claims, No Drawings

BINDER FOR ELECTRODE FORMATION, SLURRY FOR ELECTRODE FORMATION USING THE BINDER, ELECTRODE USING THE SLURRY, RECHARGEABLE BATTERY USING THE ELECTRODE, AND CAPACITOR USING THE ELECTRODE

TECHNICAL FIELD

The present invention relates to a binder for electrode formation, a slurry for electrode formation using the binder, an electrode using the slurry, a rechargeable battery using the electrode and a capacitor using the electrode.

BACKGROUND ART

In these years, with the increasing demand for the miniaturization, multifunctionalization and cordless operation of electronic devices, the development of high performance electrochemical elements has been actively promoted. Examples of such electrochemical elements include secondary batteries repeatedly usable by being charged and capacitors. Examples of the secondary batteries include nickel-cadmium secondary batteries (NiCd batteries) obtained by using cadmium, nickel-hydrogen secondary batteries (Ni-MH batteries) obtained by using hydrogen storage alloys and nonaqueous electrolyte secondary batteries (lithium ion batteries) using lithium compounds. Examples of the capacitors include redox capacitors and electric double layer capacitors.

Among these batteries, the Ni-MH batteries and the lithium ion batteries have a structure in which an electrode group fabricated by interposing separators between positive electrodes and negative electrodes is housed together with an electrolyte in a container.

The positive electrode of the Ni-MH battery is formed by binding together nickel hydroxide or nickel oxyhydroxide as an active material, carbon as a conductive material, a cobalt powder as an additive and the like to each other with a binder to prepare a mixture, and further by binding the bound mixture to a metal current collector. On the other hand, the negative electrode is electrically connected to a hydrogen storage alloy, and is prepared by coating a metal current collector such as a punching metal, a metal porous plate, a foam metal plate or a net-like metal fiber sintered plate with a paste prepared by kneading a conductive material composed of a nickel powder and the like and a binder in the presence of water and by drying the coated paste. For the electrolyte of a Ni-MH battery, an aqueous solution of a strong alkali such as potassium hydroxide is used.

The positive electrode of a lithium ion battery is prepared as follows: a mixture is prepared by adding a conductive material such as a metal powder or carbon and a binder to an active material such as lithium cobaltate; the mixture is kneaded in the presence of N-methyl-2-pyrrolidone or the like to prepare a paste; the paste is applied with a doctor blade to a metal current collector and dried; and thus the positive electrode is prepared, wherein the binder binds the active material such as lithium cobaltate and the conductive material to each other in the paste and the paste is bound to the metal current collector. On the other hand, the negative electrode is prepared as follows: a mixture is prepared by adding a binder to a carbon material as an active material; the mixture is kneaded in the presence of water or the like to prepare a paste; the paste is applied with a doctor blade to a metal current collector and dried; and thus the negative electrode is prepared, wherein the binder binds the carbon material to the metal current collector. In the electrolyte of a lithium ion battery, a nonaqueous solvent such as propylene carbonate is used, and usually a supporting electrolyte salt is added to the electrolyte.

In general, an electrode of a capacitor includes a current collector sheet formed of aluminum, stainless steel or the like and an electrode layer formed on the surface of the current collector sheet. The electrode layer is formed of a mixture composed of an active material having a high specific surface area such as activated carbon, a conduction aid such as conductive carbon and a binder. The electrode layer is formed by applying a coating liquid composed of the active material, the conduction aid and the binder to the surface of the current collector sheet. Alternatively, the electrode layer is formed by forming a sheet formed of a mixture composed of the active material, the conduction aid and the binder, and by adhering the mixture sheet to the surface of the current collector sheet. In the electrolyte of a capacitor, a nonaqueous solvent such as propylene carbonate or an aqueous solution such as a sulfuric acid aqueous solution is used, and usually a supporting electrolyte salt is added to the electrolyte.

Accordingly, a binder to form these electrodes is required to be: (1) excellent in the corrosion resistance against the electrolyte, (2) high in any of the binding property between the current collector and the active material, the binding property between the conductive materials, and the binding property between these individual materials, (3) stable under the sever environment such that a voltage is exerted to the binder in the battery and (4) low in the internal resistance and able to maintain a high conductive property when used to form an electrode. When such electrodes that meet these requirements are used as the electrodes in a rechargeable battery, the cycle properties of the rechargeable battery is improved, and when such electrodes that meet these requirements are used in a capacitor, the heat degradation resistance of the capacitor is improved.

For the purpose of meeting these requirements, the following techniques have been proposed.

JP-A-9-251856 discloses in [0007] thereof a method in which a self-emulsifiable polyolefin emulsion containing no surfactant is used as a binder for electrode formation. The self-emulsifiable polyolefin emulsion is an emulsified aqueous solution prepared by introducing carboxyl groups into the olefin skeleton in polyethylene, polypropylene or the like, by water-solubilizing the thus obtained polyolefin with an alkali such as ammonia, alkanolamine or caustic soda and additionally by highly dispersing the polyolefin for emulsification ([0008]).

JP-A-2005-63735 discloses a binder for secondary batteries including a polyolefin resin that contains an unsaturated carboxylic acid component, an ethylene component, an acrylic acid ester or methacrylic acid component. In [0020] of JP'735, presented is a method for preparing an aqueous dispersion without using any nonvolatile emulsifying agent.

JP-A-8-50894 discloses a technique in which an aqueous dispersion of a polyolefin resin having an average particle size of 20 μm or less is used as a binding agent. Claim 2 of this patent document presents, as an example, an aqueous dispersion of a thermoplastic elastomer including an ethylene-propylene copolymer.

JP-A-2002-251998 discloses an electrode binder that includes an amorphous polypropylene homopolymer or an amorphous copolymer that is a copolymer between propylene and an olefin having 2 to 8 carbon atoms wherein the content of propylene is 50% by mass or more. In [0019] of JP'998, presented are a method in which a binder is used as a solid substance as it is, a method in which a solid substance is dissolved in an organic solvent to be used and a method in which a solid substance is used as an emulsified substance.

JP-A-7-161348 discloses a technique in which an aqueous dispersion of a polyolefin resin is used at the time of preparing the negative electrode mixture. In of this patent document, disclosed as the polyolefin resin are polyethylene, polypropylene, poly-1-butene, polymethylpentene, and modified polyolefins obtained by copolymerizing other monomers; and the presented examples of the other monomers are acid components such as acrylic acid, the salts of the acid components, acrylic acid esters, methacrylic acid esters and vinyl acetate.

WO2004/104090 discloses a polyolefin resin aqueous dispersion including a polyolefin resin that contains 50 to 98% by mass of an unsaturated hydrocarbon having 3 to 6 carbon atoms and 0.5 to 20% by mass of an unsaturated carboxylic acid unit and a basic compound having a boiling point of 185° C. or lower, but substantially not including any water-compatibilizing agent having a boiling point of 185° C. or higher, wherein the number average particle size of the polyolefin resin in the aqueous dispersion is 1 μm or less.

JP-A-11-162794 and JP-A-2000-208368 each describe the use, as a binder, of a styrene-butadiene polymer having a specific composition. JP-A-2001-307965 proposes the use, as a binder, of a mixture composed of a styrene-butadiene polymer and a cellulose polymer.

However, the techniques described in the afore-mentioned individual documents have the following problems.

According to the results obtained by the present inventors' investigation of the self-emulsifiable polyolefin emulsion disclosed in JP-A-9-251856, the introduction of carboxyl groups into the olefin skeleton does not necessarily result in meeting the performance required for a binder. For example, some types of olefin resins have proved to be poor in the binding property with conductive materials, indicating that no involvement of an emulsifying agent necessarily leads to a satisfactory performance.

As for JP-A-2005-63735, the binding properties are demanded to be more improved such that a further smaller amount of the binding agent will be sufficient for successful binding.

As for JP-A-8-50894, ethylene-propylene copolymer has no ionizing functional groups such as carboxylic acids, and hence an emulsifying agent is essential for preparation of an aqueous dispersion of this copolymer. Usually, for the purpose of emulsifying such a resin having no ionizing functional groups, an emulsifying agent or the like is used for forcibly emulsifying the resin, but it is difficult to make small the particle size. Consequently, the binding agent amount required for binding a certain amount of an active material is increased to cause increase of the internal resistance of the electrode. Additionally, when an emulsifying agent is used in a binding agent, the emulsifying agent migrates to the interface associated with the active material or the electrode to degrade the binding properties, and accordingly offers problems associated with long-term usability and the cycle property.

When, as in JP-A-2002-251998, a binder resin is used as it is in a solid state, the binder undergoes an insufficient mixing performance with the active material as a coating material for electrode formation, and a thin film formation is difficult with a method involving kneading and extruding. When such a binder is dissolved with an organic solvent, recovery of the solvent is needed and adverse effects may be exerted on the environment. Additionally, when the solution, the active material and the like are mixed together, the solution uniformly covers the whole active material to increase the amount of the binder required for binding. Consequently, the internal resistance of the battery is increased to degrade the performance of the battery. On the other hand, a method in which a binder is converted to an emulsified substance can be regarded as suitable for a binder for electrode formation. However, disclosed in JP'998 is only a method for which a nonvolatile water-compatibilizing agent such as a surfactant or a carboxy-modified wax is essential although it is stated that suitable is a binder in which an emulsifying agent or a dispersant is not used or used as little as possible; additionally, presented in Examples in JP'998 is only a method in which the binder is used as a solid substance.

In JP-A-7-161348, no description is presented on the proportions of the acid component, the component of a salt of the acid component and the component of an ester of the acid component in relation to the copolymerization component. In general, the effects of the type and composition of the copolymerization component on the binding properties of the resin and the water-compatibilization of the resin are significant. However, in JP'348, the specific presentation in Examples is restricted to a homopolymer such as polyethylene or polypropylene containing no acid component and to an example in which ethylene is copolymerized with an acid component and a salt of the acid component. Additionally, as a preferable modified polyolefin, only a modified polyethylene is quoted.

The application of the aqueous dispersion liquid disclosed in WO2004/104090 is mainly the usage as adhesives for films and coating materials. This document does not contain any description on the properties as the binder for electrode formation.

The binders described in JP-A-11-162794, JP-A-2000-208368, and JP-A-2001-307965 are disadvantageously poor in heat resistance. Specifically, the activated carbon used as an electrode material is large in specific surface area, and accordingly tends to absorb moisture; therefore, the slurry applied onto the current collector is needed to be dried at a high temperature to remove the moisture in the slurry. However, when a styrene-butadiene polymer is used as a binder, disadvantageously the styrene-butadiene polymer loses its flexibility by high-temperature drying and the delamination from the current collector occurs to increase the internal resistance. When a capacitor is actually fabricated by using this binder, disadvantageously the internal resistance is high and accordingly the heat degradation resistance is low.

The present invention has been achieved for the purpose of solving the afore-mentioned problems and an object of the present invention is to provide a binder for electrode formation excellent in cycle properties when used in batteries and excellent in heat degradation resistance when used in capacitors by improving the corrosion resistance against the electrolyte, the binding properties, the stability and the internal resistance.

DISCLOSURE OF THE INVENTION

As a result of a diligent study of the afore-mentioned problems, the present inventors perfected the present invention by discovering that when an aqueous dispersion of a polyolefin resin, having a specific composition is used as a binder, the afore-mentioned problems can be solved.

The gist of the present invention is as follows.

(1) A binder for electrode formation, wherein an polyolefin resin that contains 50 to 98% by mass of an unsaturated hydrocarbon having 3 to 6 carbon atoms and 0.5 to 20% by mass of an unsaturated carboxylic acid unit is dispersed together with a basic compound in an aqueous medium, and the content of a nonvolatile water-compatibilizing agent is 5 parts by mass or less per 100 parts by mass of the polyolefin resin.

(2) The binder for electrode formation according to (1), wherein the number average particle size of the polyolefin resin is 1 μm or less.

(3) The binder for electrode formation according to (1) or (2), wherein the unsaturated hydrocarbon having 3 to 6 carbon atoms, included in the polyolefin resin is at least one of a propylene component and a 1-butene component.

(4) The binder for electrode formation according to (3), wherein the polyolefin resin further includes an ethylene component.

(5) The binder for electrode formation according to any one of (1) to (4), wherein the unsaturated carboxylic acid component of the polyolefin resin is at least one selected from the group consisting of maleic anhydride, acrylic acid and methacrylic acid.

(6) The binder for electrode formation according to any one of (1) to (5), wherein the binder includes a cross-linking agent and/or a tackifier.

(7) The binder for electrode formation according to any one of (1) to (6), wherein the binder is cross-linked by radiation irradiation.

(8) A slurry for electrode formation, including the binder for electrode formation according to any one of (1) to (7), a conductive material and an active material.

(9) An electrode formed by using the slurry for electrode formation according to (8).

(10) A rechargeable battery or a capacitor, formed by using the electrode according to (9).

The binder for electrode formation of the present invention enables the conductive material and the active material to be sufficiently bound to the current collector, and accordingly, leads to obtaining an electrode in which the active material is not detached as the charge-discharge cycle proceeds and which is capable of maintaining the binding property and the conductive property. Consequently, it is possible to produce a rechargeable battery free from degradation of the battery performance and excellent in cycle property and a capacitor excellent in heat degradation resistance.

The use of the slurry for electrode formation of the present invention enables to easily obtain an electrode excellent in the binding force between the individual materials, namely, the current collector, the active material and the conductive material.

The electrode of the present invention is particularly suitable for Ni-MH batteries, lithium ion batteries, electric double layer capacitors and the like. The use of the electrode of the present invention in a capacitor contributes to the improvement of the heat degradation resistance of the capacitor owing to the low internal resistance of the electrode.

The rechargeable battery and the capacitor of the present invention are excellent in cycle properties and heat degradation resistance, and hence may be used each alone; however, when used in combination as an electricity storage system, the rechargeable battery and the capacitor of the present invention are suitable for a long-term use. Additionally, the rechargeable battery and/or the capacitor of the present invention enables to construct an excellent electricity storage system in combination with a fuel cell, a solar power generation device, a wind power generation device and the like.

The rechargeable battery and the capacitor of the present invention, and additionally the afore-mentioned electricity storage system are not particularly limited in application, and are suitable for use in, for example, automobiles, copying machines, uninterruptible power supply systems, back-up power supplies, road raised markers, elevators, escalators and electric jar pots.

BEST MODE FOR CARRYING OUT THE INVENTION

Hereinafter, the present invention is described in detail.

The binder for electrode formation of the present invention is a binder in which a polyolefin resin that contains 50 to 98% by mass of an unsaturated hydrocarbon having 3 to 6 carbon atoms and 0.5 to 20% by mass of an unsaturated carboxylic acid unit is dispersed together with a basic compound in an aqueous medium.

The polyolefin resin in the present invention is required to include, as a monomer unit, 50 to 98% by mass of an unsaturated hydrocarbon having 3 to 6 carbon atoms, and the content of the unsaturated hydrocarbon is preferably 60 to 98% by mass, more preferably 70 to 98% by mass and particularly preferably 75 to 95% by mass. When the content of the unsaturated hydrocarbon having 3 to 6 carbon atoms is less than 50% by mass, the binding property for the conductive material may be degraded; on the other hand, when exceeds 98% by mass, the content of the unsaturated carboxylic acid unit is relatively decreased, and hence the water-compatibilization of the resin may become difficult. Examples of the unsaturated hydrocarbon having 3 to 6 carbon atoms include: alkenes such as propylene, 1-butene, isobutene, 1-pentene, 4-methyl-1-pentene, 3-methyl-1-pentene and 1-hexene; and dienes such as butadiene and isoprene. Among these, the propylene component or the butene component (such as 1-butene and isobutene) are preferable from the viewpoints of the easiness in production of the resin, the easiness in water-compatibilization of the resin, the binding property within the active material, the binding property between the active material and the current collector and the like, and alternatively, both components may also be used in combination.

The polyolefin resin in the present invention further includes, in addition to the afore-mentioned unsaturated hydrocarbon having 3 to 6 carbon atoms, preferably 1.5 to 45% by mass and more preferably 2 to 30% by mass of an ethylene component. The inclusion of the ethylene component increases the flexibility of the resin, and consequently facilitates the water-compatibilization of the resin as well as improves the binding property.

The polyolefin resin in the present invention preferably includes as the unsaturated hydrocarbon component having 3 to 6 carbon atoms at least one of the propylene component and the 1-butene component; the polyolefin resin more preferably includes the propylene component and the ethylene component or the propylene component and the 1-butene component; and the polyolefin resin may include the 1-butene component and the ethylene component. In the case where the polyolefin resin includes either the propylene component or the 1-butene component and the ethylene component, the preferable component proportions are such that the content of the propylene component or the 1-butene component is 50 to 90% by mass and the content of the ethylene component is 10 to 50% by mass wherein the total amount of the polypropylene component or the 1-butene component and the ethylene component is defined as 100% by mass.

The particularly preferable composition of the polyolefin resin is such that the polyolefin resin includes the three components, namely, the propylene component, the butene component and the ethylene component. The preferable component proportions in this case are such that the content of the propylene component is 8 to 90% by mass, the content of the butene component is 8 to 90% by mass and the content of the ethylene component is 2 to 50% by mass wherein the total amount of the three components is defined as 100% by mass.

The polyolefin resin is required to include in the structure thereof the unsaturated carboxylic acid unit in a content of 0.5 to 20% by mass from the viewpoint of the dispersibility thereof. The content of the unsaturated carboxylic acid unit is preferably 0.5 to 15% by mass, more preferably 0.5 to 12% by mass, furthermore preferably 1 to 10% by mass and particularly preferably 1 to 8% by mass. When the content of the unsaturated carboxylic acid unit is less than 0.5% by mass, it becomes difficult to conduct water-compatibilization of the polyolefin resin. On the other hand, when the content of the unsaturated carboxylic acid unit exceeds 20% by mass, the water-compatibilization of the resin is facilitated, but the binding property within the conductive material is degraded.

The unsaturated carboxylic acid unit is introduced by the unsaturated carboxylic acid or the anhydride thereof. Specific examples of the unsaturated carboxylic acid and the anhydride thereof may include acrylic acid, methacrylic acid, maleic acid, maleic anhydride, itaconic acid, itaconic anhydride, aconitic acid, aconitic anhydride, fumaric acid, crotonic acid, citraconic acid, mesaconic acid and allylsuccinic acid. Additionally, such specific examples may also include compounds each having within a molecule thereof (within the monomer unit) at least one carboxyl group or acid anhydride group, such as half-esters and half-amides of unsaturated dicarboxylic acids. Among these, from the viewpoint of the easiness in introducing into the polyolefin resin, maleic anhydride, acrylic acid and methacrylic acid are preferable, and maleic anhydride is more preferable. The acid anhydride unit introduced into the polyolefin resin tends to take an acid anhydride structure in a dry condition, and partially or wholly tends to undergo ring-opening to take a structure of the carboxylic acid or a structure of the salt of the carboxylic acid, in an aqueous medium containing the afore-mentioned basic compound.

The polyolefin resin may include a (meth)acrylic acid ester in a proportion of 20% by mass or less, from the viewpoint of facilitating the water-compatibilization of the polyolefin resin and improving the binding properties with various materials. Specific examples of the (meth)acrylic acid ester include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth)acrylate, dodecyl (meth)acrylate and stearyl (meth)acrylate.

The polyolefin resin may include, in addition to the afore-mentioned components, the following components in an amount of 20% by mass or less. Examples of such components include: alkenes and dienes having 6 or more carbon atoms such as 1-octene and norbornene; maleic acid esters such as dimethyl maleate, diethyl maleate and dibutyl maleate; (meth)acrylic acid amides; alkyl vinyl ethers such as methyl vinyl ether and ethyl vinyl ether; vinyl esters such as vinyl formate, vinyl acetate, vinyl propionate, vinyl pivalate and vinyl versatate; vinyl alcohols obtained by saponifying the vinyl esters with basic compounds or the like; 2-hydroxyethyl acrylate; glycidyl (meth)acrylate; (meth)acrylonitrile; styrene; substituted styrenes; vinyl halides; vinylidene halides; carbon monoxide; and sulfur dioxide. The mixtures of these may also be used.

In the polyolefin resin, the copolymerization modes of the components other than the unsaturated carboxylic acid unit are not particularly limited; examples of such copolymerization modes include random copolymerization and block copolymerization. Preferable among these modes is random copolymerization, from the viewpoint of easiness in polymerization.

The unsaturated carboxylic acid unit is only required to be copolymerized in the polyolefin resin, and specific examples of the copolymerization modes include random copolymerization, block copolymerization and graft copolymerization. When graft polymerization is conducted, specific examples of the usable method include a method in which in the presence of a radical generating agent, the polyolefin resin containing no unsaturated carboxylic acid component and an unsaturated carboxylic acid are heated for melting at a temperature equal to or higher than the melting point of the polyolefin resin so as to be reacted with each other, and a method in which the polyolefin resin is dissolved in an organic solvent and then allowed to react in the presence of a radical generating agent under heating and stirring, the former method being preferable because the operations involved are simple and easy. Examples of the radical generating agent used in the graft copolymerization include: organic peroxides such as di-tert-butyl peroxide, dicumyl peroxide, tert-butyl hydroperoxide, tert-butyl cumyl peroxide, benzoyl peroxide, dilauryl peroxide, cumene hydroperoxide, tert-butyl peroxybenzoate, ethyl ketone peroxide and di-tert-butyl diperphthalate; and azonitriles such as azo-bis-isobutyronitrile. These agents may be appropriately selected to be used, according to the reaction temperature.

Two or more polyolefin resins may be mixed in such a way that the component proportions fall within the afore-mentioned ranges.

As the polyolefin resin used in the present invention, the following resins may be listed. Examples of such a polyolefin resin may include a polyolefin resin obtained by using commercially available resins such as "REXTAC" manufactured by Rexene Corp., U.S.A., "Vestoplast 408" and "Vestoplast 708" manufactured by Huls Co., Ltd., Germany, and "UBE-TAC APAO" manufactured by Ube Rexene Corp., and by introducing the unsaturated carboxylic acid unit into these commercially available resins on the basis of the afore-mentioned methods. Among the afore-mentioned commercially available resins, Vestoplast 408 and Vestoplast 708 are preferably used.

The polyolefin resin used in the present invention may be cross-linked, and the cross-linking effect enables to further improve the binding property. Examples of the method for preliminary cross-linking the polyolefin resin of the present invention before the water-compatibilization of the polyolefin resin concerned include a method in which the afore-mentioned polyolefin resin is further irradiated with an actinic ray such as an electron beam or a radiation, and a method in which the resin is reacted with a cross-linking agent under the condition that the resin is dissolved or melted. Examples of the cross-linking agent include a cross-linking agent having self-cross-linkability, a cross-linking agent having, within a molecule thereof, two or more functional groups reactive with carboxyl groups, and a metal complex having multivalent coordination positions. More detailed examples of the cross-linking agent include water-insoluble polyols, polyamines and polythiols which are usually not used as surfactants. Further, examples of the cross-linking agent include isocyanate compounds, melamine compounds, urea compounds, epoxy compounds, carbodiimide compounds, oxazoline group-containing compounds, zirconium salt compounds and silane coupling agents.

The weight average molecular weight of the polyolefin resin is preferably 20,000 or more, more preferably 20,000 to 150,000, furthermore preferably 30,000 to 120,000, particularly preferably 35,000 to 100,000 and most preferably 40,000 to 90,000. When the weight average molecular weight is less than 20,000, there is a possibility that the binding property within the active material and the binding property between the active material and the current collector are degraded, and the coated layer obtained by coating after mixing with active material and the like becomes hard and brittle and accordingly cracks are created at the time of the fabrication process of batteries. When the weight average molecular weight exceeds 150,000, the water-compatibilization of the resin tends to become difficult. The weight average molecular weight of the resin can be obtained with gel permeation chromatography (GPC) by using polystyrene resins as standards.

The binder for electrode formation of the present invention is prepared by dispersing the afore-mentioned polyolefin resin together with a basic compound in an aqueous medium. The basic compound partially or wholly neutralizes the carboxyl groups in the polyolefin resin, and the electric repulsive force between the thus produced carboxyl anions prevents the mutual aggregation between the fine particles of the polyolefin resin so as to impart stability to the aqueous dispersion.

The boiling point of the basic compound at ordinary pressure is preferably lower than 250° C. from the viewpoints of the water resistance, the drying property and others. It is to be noted that in the present Description, "at ordinary pressure" means "at atmospheric pressure." When the boiling point is higher than 250° C., it is difficult to remove by evaporation the basic compound by drying from the resin coated layer, and in particular, the water resistance of the coated layer, the adhesion of the coated layer to the substrate and others may be degraded when the coated layer is dried at low temperatures. Specific examples of the basic compound include, but are not particularly limited to, ammonia, triethylamine, N,N-dimethylethanolamine, isopropylamine, aminoethanol, dimethylaminoethanol, diethylaminoethanol, ethylamine, diethylamine, isobutylamine, dipropylamine, 3-ethoxypropylamine, 3-diethylaminopropylamine, sec-butylamine, propylamine, n-butylamine, 2-methoxyethylamine, 3-methoxypropylamine, 2,2-dimethoxyethylamine, monoethanolamine, morpholine, N-methylmorpholine, N-ethylmorpholine, pyrrole and pyridine.

The addition amount of the basic compound is preferably 0.5 to 3.0 equivalents, more preferably 0.8 to 2.5 equivalents and particularly preferably 0.9 to 2.0 equivalents in relation to the carboxyl groups in the polyolefin resin. When the addition amount of the basic compound is less than 0.5 equivalent, no addition effect of the basic compound is found, and when the addition amount exceeds 3.0 equivalents, the drying time at the time of coated layer formation may be elongated or the stability of the aqueous dispersion may be degraded.

The method for dispersing the polyolefin resin in an aqueous medium is not particularly limited. For example, applicable is a method in which under a pressurized condition, the polyolefin resin, the basic compound and the aqueous medium are heated in a sealed vessel under stirring for dispersion. The aqueous medium is a liquid mainly composed of water, and may contain a water-soluble organic solvent and a water-soluble basic compound.

From the viewpoint of enhancing the dispersibility of the polyolefin resin to serve as a binder when mixed with the active material, the viewpoint of achieving close adhesion within the active material or between the active material and the conductive material to decrease the internal resistance of the electrode and the viewpoint of the storage stability of the binder for electrode formation, the number average particle size of the polyolefin resin dispersed in the binder for electrode formation of the present invention is preferably 1 µm or less, more preferably 0.5 µm or less, furthermore preferably 0.3 µm or less and particularly preferably 0.2 µm or less. When the number average particle size exceeds 1 µm, the resistance value is increased when the active material or the conductive material is bound, the low-temperature film formability is remarkably degraded, or the storage stability of the aqueous dispersion is degraded. From the viewpoints of the dispersibility, the low resistance and the storage stability and the low temperature film formability of the binder, the volume average particle size of the polyolefin resin is preferably 2 µm or less, more preferably 1 µm or less, furthermore preferably 0.5 µm or less and particularly preferably 0.3 µm or less. The preferable lower limits of the number average particle size and the volume average particle size are 0.01 µm. With the decrease of the particle size, the mixing performance with the active material is improved, but when the thickness of the binder is small, it becomes difficult to obtain a mechanical strength required for achieving the binding within the active material or the binding between the active material and the electrode. Accordingly, when the particle size is less than 0.01 µm, rather a large amount of the binder is needed for the purpose of ensuring the thickness, and there occurs a possibility that consequently the internal resistance in a battery is increased. Additionally, when the particle size is less than 0.01 µm, the increase of the solid content concentration in the aqueous dispersion increases the viscosity of the aqueous dispersion as the case may be, and when this is the case, the mixing of the binder with the conductive material or the active material does not result in preparation of a stable slurry for electrode formation as the case may be. The number average particle size and the volume average particle size of the polyolefin resin are measured by the dynamic light scattering method generally applied for measuring the particle sizes of fine particle materials.

The resin solid content in the aqueous dispersion is preferably 1 to 50% by mass, more preferably 3 to 40% by mass and particularly preferably 5 to 30% by mass in relation to the total amount of the dispersion. When the resin solid content exceeds 50% by mass, the handleability of the dispersion tends to be degraded due to the remarkable increase of the viscosity or the solidification of the dispersion. On the other hands, when the resin solid content is less than 1% by mass, the handleability of the dispersion tends to be degraded due to the remarkable decrease of the viscosity of the dispersion.

In the binder for electrode formation of the present invention, the content of the nonvolatile water-compatibilizing agent is required to be 5 parts by mass or less per 100 parts by mass of the polyolefin resin. When the content of the nonvolatile water-compatibilizing agent exceeds 5 parts by mass, the water-compatibilizing agent migrates with time to the binding interface to degrade the binding property, or the water-compatibilizing agent itself is degraded during the charge-discharge cycles as the case may be. Accordingly, the lower content of the nonvolatile water-compatibilizing agent is the more preferable. Specifically, the content of the nonvolatile water-compatibilizing agent is preferably 1 part by mass or less, more preferably 0.1 part by mass or less and it is most preferable to contain substantially no water-compatibilizing agent.

The boiling point as referred to in the present Description always means the boiling point at ordinary pressure (atmospheric pressure). Additionally, a water-compatibilizing agent having no boiling point at ordinary pressure is to fall under the category of a nonvolatile water-compatibilizing agent as referred to in the present invention. Here, the "nonvolatility" means the possession of a boiling point of 250° C.

or higher, and the "water-compatibilizing agent" means an agent or a compound added for the purpose of promoting the water-compatibilization or stabilizing the aqueous dispersion in the preparation of an aqueous dispersion.

Examples of the nonvolatile water-compatibilizing agent in the present invention include surfactants, compounds having a colloid protecting function, modified waxes, acid-modified compounds having a high acid value, water-soluble polymers and polyols.

Examples of the surfactants include cationic surfactants, anionic surfactants, nonionic surfactants, amphoteric surfactants, fluorochemical surfactants and reactive surfactants; and also include surfactants generally used for emulsion polymerization, and additionally emulsifying agents.

Examples of the anionic surfactants: sulfate salts of higher alcohols; higher alkyl sulfonic acids and the salts thereof; higher carboxylic acids such as oleic acid, stearic acid and palmitic acid, and the salts thereof; alkylbenzenesulfonic acids and the salts thereof; polyoxyethylene alkyl sulfate salts; polyoxyethylene alkyl phenyl ether sulfate salts; and vinyl sulfosuccinate.

Examples of the nonionic surfactants include compounds having a polyoxyethylene structure such as polyoxyethylene alkyl ether, polyoxyethylene alkyl phenyl ether, polyethylene glycol fatty acid ester, ethylene oxide-propylene oxide block copolymer, polyoxyethylene fatty acid amide and ethylene oxide-propylene oxide copolymer; and additionally, sorbitan derivatives such as polyoxyethylene sorbitan fatty acid ester.

Examples of the amphoteric surfactants include lauryl betaine and lauryl dimethyl amine oxide.

Examples of the reactive surfactants include reactive double bond-containing compounds such as alkylpropenylphenol polyethylene oxide adducts and sulfate salts thereof, allylalkyl phenol polyethylene oxide adducts and sulfate salts thereof, and allyldialkyl phenol polyethylene oxide adducts and sulfate salts thereof.

Examples of the compounds having a colloid protecting function, modified waxes, acid-modified compounds having a high acid value and water-soluble polymers include the following compounds generally used as fine-particle dispersion stabilizers: polyvinyl alcohol; carboxyl group-modified polyvinyl alcohol; carboxymethyl cellulose; hydroxyethyl cellulose; hydroxypropyl cellulose; modified starch; polyvinylpyrrolidone; polyacrylic acid and the salts thereof; acid-modified polyolefin waxes, usually having a weight average molecular weight of 5,000 or less, such as carboxyl group-containing polyethylene wax, carboxyl group-containing polypropylene wax and carboxyl group-containing polyethylene-propylene wax, and the salts of these waxes; acrylic acid-maleic anhydride copolymer and the salts thereof; carboxyl group-containing polymers, having an unsaturated carboxylic acid content of 20% by mass or more, such as styrene-(meth)acrylic acid copolymer, ethylene-(meth)acrylic acid copolymer, isobutylene-maleic anhydride alternate copolymer and (meth)acrylic acid-(meth)acrylic acid ester copolymer, and the salts of these copolymers; polyitaconic acid and the salts thereof; water-soluble amino group-containing acrylic copolymer; gelatin; gum arabic; and casein.

Examples of the nonvolatile polyols include water-soluble diols, polyoxyalkylene diols and polyhydric alcohols. Specific examples of such polyols include ethylene glycol, diethylene glycol, triethylene glycol, propylene glycol, butanediol and glycerin.

In the production of the binder for electrode formation of the present invention, when the polyolefin resin is dispersed in an aqueous medium, it is preferable to add an organic solvent at the time of dispersing the polyolefin resin, for the purpose of promoting the dispersion of the polyolefin resin in the aqueous medium and reducing the size of the dispersed particles. The amount of the organic solvent used accounts for preferably 50% by mass or less, more preferably 1 to 45% by mass, furthermore preferably 2 to 40% by mass and particularly preferably 3 to 35% by mass of the aqueous medium. When the amount of the organic solvent exceeds 50% by mass, the stability of the aqueous dispersion may be degraded depending on the organic solvent used.

For the purpose of obtaining a satisfactory aqueous dispersion, the water solubility of the organic solvent at 20° C. is preferably 10 g/liter or more, more preferably 20 g/liter or more, and particularly preferably 50 g/liter or more. From the viewpoint of the easiness in removing the organic solvent from the binder or the slurry, the boiling point of the organic solvent is preferably lower than 250° C., and particularly preferably 50° C. or higher and lower than 185° C. It is difficult to remove an organic solvent having a boiling point of 250° C. or higher from the resin coated layer by means of drying through evaporation, and accordingly such an organic solvent may degrade the binding property between the materials.

Specific examples of the organic solvent used include: alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol and cyclohexanol; ketones such as methyl ethyl ketone, methyl isobutyl ketone, ethyl butyl ketone, and cyclohexanone; ethers such as tetrahydrofuran and dioxane; esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate, and dimethyl carbonate; glycol derivatives such as ethylene glycol monomethyl ether, ethylene glycol monoethyl ether, ethylene glycol monopropyl ether, ethylene glycol monobutyl ether and ethylene glycol ethyl ether acetate; 1-methoxy-2-propanol; 1-ethoxy-2-propanol; 3-methoxy-3-methyl-1-butanol; methoxybutanol; acetonitrile; dimethylformamide; dimethylacetamide; diacetone alcohol; ethyl acetoacetate; 1,2-dimethylglycerin; 1,3-dimethylglycerin; trimethylglycerin; and N-methylpyrrolidone. These organic solvents may be used as mixtures of two or more thereof.

From the viewpoint of high promotion effect of water-compatibilization of the resin, preferable among these are ethanol, n-propanol, isopropanol, n-butanol, methyl ethyl ketone, cyclohexanone, tetrahydrofuran, dioxane, ethylene glycol monoethyl ether, ethylene glycol monopropyl ether, ethylene glycol monobutyl ether, diethylene glycol monomethyl ether and N-methylpyrrolidone. Among these, the organic solvents each having one hydroxyl group within a molecule thereof are more preferable, and n-propanol, tetrahydrofuran and ethylene glycol alkyl ethers are furthermore preferable because addition of small amounts of these solvents enables to water-compatibilize the resin.

When the afore-mentioned organic solvents are used at the time of dispersing the polyolefin resin, the amounts of such organic solvents can be reduced by partially distilling, after dispersing, the solvents away from the system by means of the desolventization treatment generally referred to as "stripping." The organic solvent content in the aqueous dispersion can be reduced to 10% by mass or less by stripping. It is environmentally desirable to reduce the organic solvent content to 5% by mass or less.

Various additives may be appropriately used in the binder for electrode formation of the present invention, for the purpose of improving the binding property of the binder.

Examples of the additives include a cross-linking agent and a tackifier. Both of these may be used in combination.

Examples of the cross-linking agent include a cross-linking agent having self-cross-linkability, a cross-linking agent having within a molecule thereof, two or more functional groups reactive with carboxyl groups, and a metal complex having multivalent coordination positions. More specific examples of the cross-linking agent include isocyanate compounds, melamine compounds, urea compounds, epoxy compounds, carbodiimide compounds, oxazoline group-containing compounds, zirconium salt compounds and silane coupling agents. The addition amount of the cross-linking agent is appropriately selected within a range from 0.01 to 100 parts by mass in relation to 100 parts by mass of the resin in the binder.

As the tackifier, various known tackifiers can be used. Examples of the tackifier include rosins, rosin derivatives and terpene resins. These may be used each alone or as mixtures of two or more thereof.

Examples of the rosins include raw material rosins such as a gum rosin, a wood rosin and a tall oil rosin, and also include stabilized rosins and polymerized rosins obtained by disproportionation or hydrogenation treatment of the raw material rosins.

Examples of the rosin derivatives include rosin esters and rosin phenols. Among these, examples of the rosin esters include rosin esters obtained by subjecting rosins and polyhydric alcohols to esterification reaction; polyhydric alcohol esters of partially maleinated or partially fumarated rosins obtained by first partially fumarating or maleinating raw material rosins and by thereafter esterifying the partially fumarated or partially maleinated rosins; and polyhydric alcohol esters of partially maleinated or partially fumarated disproportionated rosins obtained by first partially fumarating or maleinating raw material rosins and by thereafter disproportionating and successively esterifying the partially fumarated or partially maleinated rosins. The rosin phenols mean the compounds obtained by adding phenols to rosins and by heat-polymerizing the thus obtained adducts or obtained by successive esterification. The polyhydric alcohols used for esterification are not particularly limited, and examples of the usable polyhydric alcohols include various known polyhydric alcohols such as diethylene glycol, glycerin, trimethylolpropane, trimethylolethane, 1,2,6-hexanetriol, 1,2,4-butanetriol and pentaerythritol.

Examples of the usable terpene resins include: α-pinene resins and β-pinene resins; aromatic-modified terpene resins obtained by copolymerizing terpenes such as α-pinene and β-pinene with aromatic monomers such as styrene; and the hydrogenated products of these resins.

Preferable among these tackifiers are the rosin esters and the terpene resins because the use of the rosin esters and the terpene resins improves the binding property. These tackifiers may be added to the binder for electrode formation after these tackifiers are converted into aqueous dispersions containing these tackifiers, or after these tackifiers are converted into solutions containing these tackifiers dissolved therein.

When a tackifier is added, the amount thereof is preferably 70 parts by mass or less in relation to 100 parts by mass of the polyolefin resin; from the viewpoint of the binding property, the amount thereof is more preferably 1 to 50 parts by mass, furthermore preferably 2 to 40 parts by mass and particularly preferably 3 to 30 parts by mass. When the amount thereof exceeds 70 parts by mass, the binding property tends to be degraded.

The binder for electrode formation of the present invention may be subjected to radiation irradiation for the purpose of improving the binding property through cross-linkage formation.

As the radiation source to be used in this case, α-ray, β-ray (electron beam), γ-ray, X-ray, ultraviolet ray and the like may be used. Preferable among these are the β-ray, γ-ray and X-ray from cobalt 60; among these, preferable are a γ-ray treatment and a β-ray treatment based on the use of an electron accelerator. These radiation rays may be used for irradiation each alone or used simultaneously in combinations of two or more thereof; alternatively, one or more of these radiation rays may be used for irradiation at predetermined time intervals.

When the aqueous dispersion is irradiated with a radiation ray, the aqueous dispersion placed in a vessel is disposed in the vicinity of the radiation source. In this case, it is preferable to substantially uniformly irradiate the aqueous dispersion by varying the position of the radiation source or the vessel during irradiation, or by stirring the aqueous dispersion. Alternatively, after a part of the aqueous dispersion is disposed for irradiation in the vicinity of a γ-ray source for the purpose of generating radicals, the part of the aqueous dispersion may be mixed with the rest of the aqueous dispersion. Yet alternatively, the aqueous dispersion may be irradiated with a radiation while the aqueous dispersion is being fed with a pump or the like.

The irradiation dose of the radiation is not particularly limited, but is preferably 10 to 400 kGy, more preferably 20 to 300 kGy and furthermore preferably 25 to 200 kGy. When the irradiation dose is less than 10 kGy, the cross-linking proceeds to an insufficient extent. On the other hand, when the irradiation dose exceeds 400 kGy, the cross-linking proceeds to an excessive extent, and accordingly the flexibility and the mechanical properties are degraded to cause a possibility that cracks tend to be generated.

The atmosphere at the time of radiation irradiation is not particularly limited, but the lower the oxygen concentration, the smaller the irradiation dose of the radiation can be made. The atmosphere may be replaced with an inert gas such as nitrogen or argon.

In the binder for electrode formation, for the purpose of promoting cross-linking, a known compound capable of generating an active radical species by radiation irradiation or a known compound achieving radiation-induced cross-linking by radiation may be included. Examples of the former include Irgacure 184 and 907 (trade names) manufactured by Ciba Specialty Chemicals Inc. Examples of the latter include TAIC triallyl isocyanurate (trade name and registered trademark in Japan) and TAIC prepolymer (trade name and registered trademark in Japan) manufactured by Nippon Kasei Chemical Co., Ltd. The amount of such a compound used is preferably 0.01 to 10 parts by mass in relation to 100 parts by mass of the polyolefin resin.

The achievement of the cross-linking in the polyolefin resin after radiation irradiation can be identified by the occurrence or nonoccurrence of the insoluble fraction (gel) observed when the polyolefin resin is dissolved in a good solvent for this resin.

When an electrode is formed by using the binder for electrode formation of the present invention, a preferable process is as follows: a conductive material and an active material are mixed in the binder for electrode formation to prepare a slurry for electrode formation that includes the binder for electrode formation, the conductive material and the active material; the slurry thus obtained is applied onto a metal current collector and dried, and then molded with a roll press. Alternatively, an electrode may also be formed by immersing a metal current collector in the slurry and thereafter drying the current collector.

As the conductive material, a metal and the compounds thereof or a carbon material can be used. Examples of the metal and the compounds thereof include: nickel, cobalt, titanium, cobalt oxide and titanium oxide. Examples the carbon material include Ketjen black, acetylene black, furnace black, graphite and carbon fiber. The carbon fiber includes so-called carbon nanotube and carbon nanofiber. The carbon nanotube (CNT) includes a single-wall CNT in which the carbon tube structure is of a single tube, a double-wall CNT in which the tube structure is of a double layer tube and a multi-wall CNT in which the tube structure is of a triple or higher multiple layer tube. Additionally, the carbon nanotube also includes the forms such as a nanohorn form in which one end of the tube is closed and the other end is opened and a cup form in which the opening at one end is larger than the opening at the other end.

When a carbon material is used as the conductive material, it is preferable to use graphite, carbon black or carbon fiber, and it is more preferable to use, in combination, two or more types selected from these three types of carbon materials for the purpose of decreasing the electric resistance value of the obtained coated layer. When a conductive coated layer is formed by using only any one of graphite, carbon black and carbon fiber each being the conductive material, electric contact points between particles tend to be insufficient, and accordingly the decrease of the resistance value necessarily undergoes inevitable limit. When two or more of these conductive materials are used in combination, conceivably such conductive materials are filled so as to infill the voids between the conductive material particles, and thus the coated layer as a whole enables to achieve the decrease of the electric resistance value.

When two or more types of conductive materials are used in combination, the mixing proportions of graphite, carbon black and carbon fiber in 100% by mass of the total conductive materials are preferably in ranges from 10 to 90% by mass, from 10 to 80% by mass and from 0.005 to 30% by mass, respectively, and more preferably from 20 to 80% by mass, from 20 to 70% by mass and from 0.05 to 10% by mass, respectively.

Preferable as graphite are particles of natural or artificial, scale-like, spherical or expanded graphite. More preferable among these is expanded graphite. The average particle size of graphite is preferably 0.5 to 300 μm and more preferably 0.5 to 100 μm. The bulk density of expanded graphite is preferably 0.8 g/cm$^3$ or less, more preferably 0.4 g/cm$^3$ or less and furthermore preferably 0.2 g/cm$^3$ or less.

Examples of carbon black include acetylene black, furnace black and Ketjen black, and the primary particle size of carbon black is preferably 1 to 100 nm.

The fiber diameter of carbon fiber is preferably 0.001 to 0.5 μm and more preferably 0.003 to 0.2 μm. The fiber length of carbon fiber is preferably 1 to 100 μm and more preferably 1 to 30 μm. The aspect ratio of carbon fiber is preferably 2 to 50000, and more preferably 5 to 15000 from the viewpoint of the conductive property.

When an electrode of a nickel-hydrogen battery is fabricated, it is recommended to use a metal or a compound thereof as the conductive material; nickel and cobalt and compounds thereof are preferable. In the case of an electrode of a lithium ion battery or a capacitor, it is recommended to use a carbon material as the conductive material; graphite, carbon black and carbon fiber are preferable.

As the active material, the following are used. Examples of the positive electrode active material of a Ni-MH battery include nickel hydroxide and oxides of nickel such as nickel oxide. Examples of the negative electrode active material of a Ni-MH battery include hydrogen storage alloys. Examples of the positive electrode active material of a lithium ion battery include lithium-containing transition metal oxides such as lithium cobaltate and lithium manganate. Examples of the negative electrode active material of a lithium ion battery include graphite and compounds, salts, alloys and oxides containing thallium, titanium, silicon, tin, iron and the like. Examples of the positive or negative electrode active material of a capacitor include active materials having a high specific surface area such as activated carbon.

Examples of the metal current collector include nickel-plated resin thin film, nickel foil, aluminum foil, copper foil and stainless steel foil. Additionally, examples of the metal current collector include the following articles using these metals: net-like or plate-like punching metal, expanded metal, metal gauze, foam metal, and a non-baked substrate or a baked substrate of net-like metal fiber.

The individual mixing proportions of the binder for electrode formation, the conductive material and the active material in the slurry for electrode formation are as follows.

The mixing proportions of the binder for electrode formation and the conductive material are preferably such that the mixing ratio between the polyolefin resin and the conductive material in the binder is set within a range from 95/5 to 5/95 in terms of mass ratio. When the proportion of the polyolefin resin exceeds 95% by mass, the electric resistance value tends to be too high in the obtained electrode. On the other hand, when the proportion of the polyolefin resin is less than 5%, no sufficient binding property between the current collector, the active material and the conductive material may be attained.

The mixing proportions of the binder for electrode formation and the active material are preferably such that the amount of the polyolefin resin in the binder for electrode formation is set at 0.05 to 25 parts by mass in relation to 100 parts by mass of the active material. The amount of the polyolefin resin is more preferably 0.1 to 20 parts by mass. When the amount of the polyolefin resin is less than 0.05 part by mass, the force for binding the active material to the current collector becomes insufficient to lead to a possibility that the detachment of the active material decreases the capacity of the battery. On the other hand, when the amount of the polyolefin resin exceeds 25 parts by mass to be too large, the internal resistance of the battery is increased to lead to a possibility that the battery property is degraded. It is to be noted that the active material includes a substance, to function as a conductive material, such as graphite. When such a material is used, it is preferable for the mixing amount of such a material to satisfy the afore-mentioned preferable mixing proportion as the active material, and at the same time, for the mixing amount of such a material to fall within the afore-mentioned preferable mixing proportion range involving the binder and the conductive material with the proviso that such a material is taken as the conductive material.

The conditions and the method for producing the slurry for electrode formation are not particularly limited; for example, the binder for electrode formation, the conductive material and the active material are mixed together at normal temperature or at an appropriately controlled temperature, and thereafter a mechanical dispersion treatment, an ultrasonic dispersion treatment or the like can be applied to the mixture thus obtained. The conductive material and the active material may be beforehand dispersed in a wetting agent and water to be thereafter mixed with the binder for electrode formation.

Other examples of the method for obtaining the slurry for electrode formation include: a method in which the conductive material and the active material are beforehand dispersed in the polyolefin resin, and this polyolefin resin with the conductive material and the active material dispersed therein is subjected to a water-compatibilization dispersion treatment together with the basic compound to prepare the slurry; and a method in which the conductive material is beforehand dispersed in the polyolefin resin, and the polyolefin resin with the conductive material dispersed therein is subjected to a water-compatibilization dispersion treatment together with the basic compound, and then mixed with the active material to prepare the slurry. In these cases, for the purpose of dispersing the conductive material and the active material in the polyolefin resin, a kneader, a double screw kneader, a solid layer shearing machine or the like can be used. In this connection, in advance of dispersing the conductive material in the polyolefin resin, the conductive material can also be beforehand mixed with a wetting agent.

For the purpose of enhancing the dispersibility of the slurry for electrode formation, a dispersion treatment apparatus may also be used. Examples of a dispersion treatment apparatus in which a high shear force is applied in such a way that dispersion is conducted with the aid of the shear force exerted between the slurry and the wall surface include a colloid mill and a roll mill, and additionally media mills typified by a ball mill and a sand mill. Additionally, a homogenizer-type dispersion treatment apparatus is included in examples of a dispersion treatment apparatus in which a jet flow is generated in a slurry, and dispersion is conducted with the speed difference in the slurry namely, the liquid-liquid shear within the substance under treatment. It is preferable to use such a homogenizer-type dispersion treatment apparatus as a dispersion treatment apparatus.

In the production of the slurry for electrode formation, a small amount of a water-soluble polymer may be added as a wetting agent. The water-soluble polymer used is not particularly limited, but effective as the water-soluble polymer are cellulose derivatives such as methyl cellulose, carboxymethyl cellulose and hydroxymethyl cellulose. These cellulose derivatives improve the wetting property between the individual materials, namely, the current collector, the active material and the conductive material. The mixing amount of the water-soluble polymer is preferably 0.01 to 5 parts by mass, more preferably 0.01 to 1 part by mass and furthermore preferably 0.01 to 0.5 part by mass, in relation to 100 parts by mass of the total mass of the polyolefin resin, the conductive material and the active material.

The electrode formed by using the slurry for electrode formation of the present invention is used in a rechargeable battery or a capacitor, in combination with the following other constituent members. A rechargeable battery or a capacitor is fabricated by sealing in a container the electrodes fabricated by the afore-mentioned method, a separator and an electrolyte in a conventional manner. In this fabrication, for the constituent members other than the electrodes, such as the separators and the electrolyte, known respective constituent members can be used.

Specifically, in the case of a Ni-MH battery, polyethylene nonwoven fabric, polypropylene nonwoven fabric, polyamide nonwoven fabric and hydrophilized products of these fabrics are used as the separator, and an aqueous solution of potassium hydroxide, an aqueous solution prepared by adding sodium hydroxide and/or lithium hydroxide to an aqueous solution of potassium hydroxide and other solutions are used as the electrolyte.

In the case of a lithium ion battery, polyethylene nonwoven fabric, polypropylene nonwoven fabric, polyamide nonwoven fabric, glass fiber and the like are used as the separator, and an electrolyte prepared by adding a supporting electrolyte salt such as lithium phosphate hexafluoride or lithium perchlorate to a nonaqueous solvent can be used as the electrolyte wherein the nonaqueous solvent is one of nonaqueous solvents such as propylene carbonate, ethylene carbonate and dimethyl carbonate or a mixed solvent composed of two or more of these nonaqueous solvents.

In the case of a capacitor, usable examples as the separator include the following known materials: microporous film or nonwoven fabric made of polyolefin such as polyethylene or polypropylene; porous film made of pulp as the main raw material, generally referred to as electrolytic capacitor paper; and porous resins containing inorganic ceramic powders. In place of the separator, solid electrolytes or gel electrolytes may also be used. Examples of the electrolytes include: tetraethylammonium tetrafluoroborate, triethylmonomethylammonium tetrafluoroborate, tetraethylammonium hexafluorophosphate, an ionic liquids, a sulfuric acid aqueous solution and a potassium hydroxide aqueous solution. The solvent (electrolyte solvent) for dissolving the electrolyte is also not particularly limited as long as the solvent is a solvent generally used as an electrolyte solvent. Specific examples of such a solvent include: carbonates such as propylene carbonate, ethylene carbonate and butylene carbonate; lactones such as γ-butyrolactone; sulfolanes; nitriles such as acetonitrile; and ionic liquids. These solvents may be used each alone or as mixed solvents composed of two or more thereof.

EXAMPLES

Hereinafter, the present invention is described in detail with reference to Examples. However, the present invention is in no way limited by these Examples.

Individual properties were measured or evaluated according to the following methods.

(1) Content of the Unsaturated Carboxylic Acid Unit

The acid value of the polyolefin resin was measured in conformity with JIS K5407, and the content of the unsaturated carboxylic acid unit was derived from the measured value.

(2) Constitution of the Resin Other than the Unsaturated Carboxylic Acid Unit

Analyses based on $^1$H-NMR and $^{13}$C-NMR analyses (used was an analytical instrument manufactured by Varian Inc., 300 MHz) were conducted in ortho-dichlorobenzene ($d_4$) at 120° C. to derive the constitution. In the $^{13}$C-NMR analysis, measurements were conducted by using a gated decoupling method that takes account of application to quantitative analysis.

(3) Weight Average Molecular Weight of the Polyolefin Resin

A GPC analyzer (HLC-8020, column: TSK-GEL, manufactured by Tosoh Corp.) was used. A sample was dissolved in tetrahydrofuran and measurement was made at 40° C. On the basis of the calibration curve prepared with polystyrene standards, the weight average molecular weight was derived. For the cases where samples were hardly soluble in tetrahydrofuran, ortho-dichlorobenzene was used.

(4) Solid Content Concentration of the Binder

An appropriate amount of the binder for electrode formation was weighed, and heated at 150° C. until the mass of the residual substance (solid content) reached a constant value. Thereafter, the sample was weighed to obtain the solid content concentration.

(5) Number Average Particle Size and Volume Average Particle Size of the Polyolefin Resin Particle The number average particle size (mn) and the volume average particle size (mv) were obtained by using Microtrack particle size distribution analyzer UPA 150 (Model No. 9340) manufactured by Nikkiso Co., Ltd. The refractive index of the resin was set at 1.5.

(6) Storage Stability

After the preparation of the binder, the binder was stored for 30 days at 30° C. Thereafter, the occurrence or nonoccurrence of the aggregates was identified by visual inspection. The case where no aggregates were found was given an evaluation mark ○, and the case where aggregates were found was given an evaluation mark X.

(7) Binding Property

The slurry for electrode formation was applied to one side of a piece of metal (nickel, aluminum and copper) foil, dried and then cut to prepare a sample of a size of 1.5 cm×9 cm. The coating side of the sample was adhesively fixed, and then the metal foil side was peeled off to measure the 180-degree peel strength according to the peel test specified in JIS K6854-2. The 180-degree peel strength thus obtained was adopted as the binding property index.

(8) Cycle Property (Evaluation Method of a Ni-MH Rechargeable Battery)

A charge-discharge cycle in which a test battery was charged at 1 C up to 150% and then discharged at 1 C with a cut-off voltage set at 1.0 V was repeated up to 500 times. Then, the cycle property of the battery which was able to maintain the capacity at a level of 70% or more of the initial capacity was given an evaluation mark 0, and the cycle property of the battery which was able to maintain the capacity at a level of less than 70% of the initial capacity was given an evaluation mark X.

(9) Cycle Property (Evaluation Method of a Lithium Ion Rechargeable Battery)

A charge-discharge cycle in which a test battery was subjected to a constant current-constant voltage charging (CCCV-4.3 V) at 0.1 C and then discharged at 0.5 C with a cut-off voltage set at 3.1 V was repeated 500 times. Then, the cycle property of the battery which was able to maintain the capacity at a level of 80% or more of the initial capacity was given an evaluation mark ○, and the cycle property of the battery which was able to maintain the capacity at a level of less than 80% of the initial capacity was given an evaluation mark X.

(10) Volume Resistivity (Evaluation Method of a Capacitor)

A simulated electrode was obtained in the same manner as in the below-described "production of an electrode of a capacitor" except that a slurry was applied to a glass plate. The volume resistivity of the simulated electrode was measured with Lorester-GP (manufactured by Dia Instruments Co., Ltd.). The lower volume resistivity of the simulated electrode indicates the lower internal resistance. In other words, the lower volume resistivity indicates the larger electric capacity and hence the better capacitor performance.

(11) Heat Degradation Resistance (Evaluation Method of a Capacitor)

The heat degradation resistance was evaluated in terms of the capacity ratio obtained by a comparison between the initial electric capacity and the electric capacity after being maintained at 70° C. for 24 hours. Specifically, (Capacity ratio)=[(Electric capacity after being maintained at 70° C. for 24 hours)/(initial electric capacity)]×100

The heat degradation resistance for the capacity ratio of 90% or more was given an evaluation mark ○, and the heat degradation resistance for the capacity ratio of less than 90% was given an evaluation mark X.

(Production of Polyolefin Resin "P-1")

In a four-necked flask, under nitrogen atmosphere, 280 g of a ternary propylene-butene-ethylene copolymer (Vestoplast 708, propylene/butene/ethylene=64.8/23.9/11.3 in percent by mass, manufactured by Huls Japan Co., Ltd.) was heated to be melted. Thereafter, while the temperature within the reaction system was being maintained at 170° C., 32.0 g of maleic anhydride as an unsaturated carboxylic acid and 6.0 g of dicumyl peroxide as a radical generating agent were added under stirring to the reaction system, respectively, over a period of 1 hour, and then the reaction system was allowed to react for 1 hour. After completion of the reaction, the obtained reaction product was placed in a large amount of acetone to precipitate a resin. The resin was further washed with acetone several times to remove the unreacted maleic anhydride, and then dried under reduced pressure in a reduced pressure dryer to yield the polyolefin resin "P-1".

(Production of Polyolefin Resin "P-2")

The polyolefin resin "P-2" was obtained in the same manner as in (Production of polyolefin resin "P-1") except that a ternary propylene-butene-ethylene copolymer (Vestoplast 408, propylene/butene/ethylene=12.3/82.2/5.5 in percent by mass, manufactured by Huls Japan Co., Ltd.) was used.

(Production of Polyolefin Resin "P-3")

In a four-necked flask, under nitrogen atmosphere, 280 g of a propylene-ethylene copolymer (propylene/ethylene=81.8/18.2 in percent by mass, weight average molecular weight: 85,000) was heated to be melted. Thereafter, while the temperature within the reaction system was being maintained at 180° C., 35.0 g of maleic anhydride as an unsaturated carboxylic acid and 6.0 g of di-t-butyl peroxide as a radical generating agent were added under stirring to the reaction system, respectively, over a period of 2 hours, and then the reaction system was allowed to react for 1 hour. After completion of the reaction, the obtained reaction product was placed in a large amount of acetone to precipitate a resin. The resin was further washed with acetone several times to remove the unreacted maleic anhydride, and then dried under reduced pressure in a reduced pressure dryer to yield the polyolefin resin "P-3".

(Production of Polyolefin Resin "P-4")

In a four-necked flask equipped with a stirrer, a condenser and a dropping funnel, under nitrogen atmosphere, 100 g of a ternary propylene-butene-ethylene copolymer (Vestoplast 708, propylene/butene/ethylene=64.8/23.9/11.3 in percent by mass, manufactured by Huls Japan Co., Ltd.) and 500 g of toluene were heated to be melted. Thereafter, while the temperature within the reaction system was being maintained at 110° C., a heptane solution of 1.0 g of dicumyl peroxide as a radical generating agent in 20 g of heptane was added to the reaction system over a period of 1 hour. Thereafter, 7.0 g of maleic anhydride as an unsaturated carboxylic acid, 10.0 g of lauryl acrylate and a heptane solution of 0.5 g of dicumyl peroxide in 10 g of heptane were added dropwise respectively over a period of 1 hour, and then the reaction system was allowed to react for 30 minutes. After completion of the reaction, the reaction system was cooled down to room temperature. Then, the obtained reaction product was placed in a large amount of acetone to precipitate a resin. The resin was further washed with acetone several times to remove the unreacted materials, and then dried under reduced pressure in a reduced pressure dryer to yield the polyolefin resin "P-4".

The properties of the obtained polyolefin resins "P-1" to "P-4" are shown in Table 1.

TABLE 1

| Poly-olefin | Constitution (% by mass) | | | | | Weight average molecular weight |
| --- | --- | --- | --- | --- | --- | --- |
| | Propylene | Butene | Ethylene | Acrylic acid ester | Maleic anhydride | |
| P-1 | 60.7 | 22.4 | 10.6 | 0 | 6.3 | 40000 |
| P-2 | 11.5 | 77.3 | 5.2 | 0 | 6.0 | 55000 |
| P-3 | 75.4 | 0 | 16.8 | 0 | 7.8 | 38000 |
| P-4 | 57.9 | 21.3 | 10.1 | 6.5 | 4.2 | 50000 |

(Production of Polyolefin Resin "P-5")

In a three necked separable flask equipped with a stirrer, 100 parts by mass of the afore-mentioned polyolefin resin "P-4", 6 parts by mass of KRASOL HLBH-P3000 (a hydrogenated product of a hydroxyl group-terminated polybutadiene, average molecular weight: 3100 (based on the technical data of the manufacturer)) manufactured by Idemitsu Petroleum Chemical Co., Ltd. as a cross-linking agent and 100 parts by mass of toluene were placed to prepare a suspension solution. Successively, while water was being removed together with the distilled toluene, the suspension solution was heated under stirring at 190° C. to be allowed to react over a period of 2 hours, and then dried under reduced pressure in a reduced pressure dryer to yield the polyolefin resin "P-5".

Example 1

Production of the Binder "E-1"

By using a stirrer having a 1-liter volume, hermetically sealable pressure-resistant glass vessel equipped with a heater, 60.0 g of the polyolefin resin (P-1), 90.0 g of n-propanol (special grade, boiling point: 97° C., manufactured by Wako Pure Chemicals Industries, Ltd.), 6.2 g of N,N-dimethylethanolamine (special grade, boiling point: 134° C., manufactured by Wako Pure Chemicals Industries, Ltd.) and 143.8 g of distilled water were placed in the glass vessel and stirred at a rotation speed of stirring blades set at 300 rpm. Thus, no precipitation of the resin was found on the bottom of the vessel, and the resin was verified to take a floating state. Accordingly, after 10 minutes, while this state was being maintained, the power of the heater was turned on for heating. Thus, while the temperature within the reaction system was being maintained at 140° C., the reaction system was stirred further for 60 minutes. Then, the reaction system was cooled down to room temperature (about 25° C.) by air cooling under stirring at the unaltered rotation speed of 300 rpm, and then pressure-filtered (air pressure: 0.2 MPa) with a 300-mesh stainless steel filter (wire diameter: 0.035 mm, plain weave) to yield a milky-white-yellow homogeneous binder to be referred to as the binder "E-1".

Example 2

Production of the Binder "E-2", and Organic Solvent Removal Operation of "E-1"

In a 0.5-liter two-necked round-bottom flask, 200 g of "E-1" obtained in the afore-mentioned manner and 150 g of distilled water were placed, the flask was equipped with a mechanical stirrer and a Liebig condenser, the flask was continuously heated in an oil bath and the aqueous medium was distilled off. When about 150 g of the aqueous medium was distilled off, the heating was terminated, and the flask was cooled down to room temperature. After cooling, the liquid content in the flask was pressure-filtered (air pressure: 0.2 MPa) with a 300-mesh stainless steel filter (wire diameter: 0.035 mm, plain weave) to yield a milky-white homogeneous binder to be referred to as the binder "E-2". The content proportion of the organic solvent in this aqueous dispersion was found to be 0.8% by mass.

Examples 3 to 6

Production of the Binders "E-3" to "E-6"

The type of the polyolefin resin, the type and the amount of the organic solvent, and the type of the basic compound were altered as described in Table 2. And, first, the same operations as in Example 1 were conducted to yield four types of binders. Next, the individual obtained binders were subjected to the organic solvent removal operation in the same manner as in Example 2, to yield the binders "E-3" to "E-6". Here, it is to be noted that the boiling points of tetrahydrofuran (special grade, manufactured by Wako Pure Chemicals Industries, Ltd.) and n-propanol (special grade, manufactured by Wako Pure Chemicals Industries, Ltd.) used as organic solvents were 66° C. and 97° C., respectively, and the boiling points of triethylamine (special grade, manufactured by Wako Pure Chemicals Industries, Ltd.) and N,N-dimethylethanolamine (special grade, manufactured by Wako Pure Chemicals Industries, Ltd.) used as basic compounds were 90° C. and 134° C., respectively.

Comparative Example 1

Production of the Binder "H-1"

In addition to the ingredients in Example 1, a nonvolatile water-compatibilizing agent, namely, Noigen EA-190D (nonionic surfactant, manufactured by Dai-ichi Kogyo Seiyaku Co., Ltd.) was added in an amount of 7 parts by mass in relation to 100 parts by mass of the resin solid content. Otherwise in the same manner as in Example 1, the water-compatibilization of the resin was conducted to yield the binder "H-1".

Comparative Example 2

Production of the Binder "H-2"

By using a stirrer having a 1-liter volume, hermetically sealable pressure-resistant glass vessel equipped with a heater, 60.0 g of Primacor 5980I (ethylene-acrylic acid copolymer resin, copolymer containing 20% by mass of acrylic acid, manufactured by Dow Chemical Co.; hereinafter referred to as the polyolefin resin "P-6"), 17.7 g (1.05 equivalents in relation to the carboxyl group of acrylic acid in the resin) of triethylamine and 222.3 g of distilled water were placed in the glass vessel and stirred at a rotation speed of stirring blades set at 300 rpm. Thus, no precipitation of the resin was found on the bottom of the vessel, and the resin was verified to take a floating state. Accordingly, after 10 minutes, while this state was being maintained, the power of the heater was turned on for heating. Thus, while the temperature within the reaction system was being maintained at 120° C., the reaction system was stirred further for 30 minutes. Then, the reaction system was cooled down to room temperature (about 25° C.) by air cooling under stirring at the unaltered rotation speed of 300 rpm, and then pressure-filtered at an air pressure of 0.2 MPa, with a 300-mesh stainless steel filter (wire diameter: 0.035 mm, plain weave) to yield a slightly clouded binder to be referred to as the binder "H-2", without finding any resin remaining on the filter.

Comparative Example 3

Production of the Binder "H-3"

As the polyolefin resin, Nucrel N1050H (ethylene-methacrylic acid copolymer, the content of methacrylic acid: 10% by mass, manufactured by Du Pont-Mitsui Polychemicals Co., Ltd.; hereinafter referred to as the polyolefin resin "P-7") was used. Otherwise, the same operations as in Example 1 were conducted to yield a binder. The binder was thickened after cooling, accordingly diluted with water so as for the solid content concentration to be 10% by mass, and thereafter filtered with a filter to yield a binder to be referred to as the binder "H-3".

The fed compositions and the liquid properties of the various binders obtained in Examples 1 to 6 and Comparative Examples 1 to 3 are shown in Table 2.

parts by mass of the solid content of the binder "E-2". The mixture thus obtained was placed in a glass sample bottle, the air in the sample bottle was purged with nitrogen, and then the mixture was irradiated with γ-ray from cobalt-60 as a radiation source at a dose of 50 kGy to yield a binder "E-9".

Example 10

For the purpose of promoting the cross-linking, triallyl isocyanurate (TAIC, manufactured by Nippon Kasei Chemical Co., Ltd.) was added to the binder "E-7" obtained in Example 7 in such a way that the quantity of triallyl isocyanurate amounted to 0.1 part by mass in relation to 100 parts by mass of the solid content of the binder "E-7". The mixture thus obtained was placed in a glass sample bottle, the air in the sample bottle was purged with nitrogen, and then the mixture was irradiated with γ-ray from cobalt-60 as a radiation source at a dose of 25 kGy to yield a binder "E-10".

The fed compositions of the various binders obtained in Examples 7 to 10 are shown in Table 3.

TABLE 2

|  |  | Examples | | | | | | Comparative Examples | | |
| --- | --- | --- | --- | --- | --- | --- | --- | --- | --- | --- |
|  |  | 1 | 2 | 3 | 4 | 5 | 6 | 1 | 2 | 3 |
| Binder |  | E-1 | E-2 | E-3 | E-4 | E-5 | E-6 | H-1 | H-2 | H-3 |
| Fed | Polyolefin resin | P-1 | P-1 | P-2 | P-3 | P-4 | P-5 | P-1 | P-6 | P-7 |
| composition | Basic compound | DMEA | DMEA | DMEA | TEA | TEA | DMEA | DMEA | TEA | DMEA |
|  | Organic NPA | 30 | 30 | — | 35 | — | 35 | 30 | — | 30 |
|  | solvent THF | — | — | 40 | — | 25 | — | — | — | — |
|  | (% by mass) |  |  |  |  |  |  |  |  |  |
|  | Surfactant Type | — | — | — | — | — | — | EA-190D | — | — |
|  | Amount (parts by mass) | 0 | 0 | 0 | 0 | 0 | 0 | 7 | 0 | 0 |
| Liquid | Solid content concentration (% by mass) | 20.0 | 19.9 | 19.8 | 20.1 | 20.0 | 20.2 | 20.3 | 20.1 | 10.2 |
| properties | Particle sizes mn | 0.090 | 0.102 | 0.153 | 0.241 | 0.131 | 0.115 | 4.32 | 0.012 | 0.155 |
|  | (μm) mv | 0.162 | 0.210 | 0.431 | 0.713 | 0.294 | 0.186 | 10.28 | 0.016 | 0.860 |
|  | Content of organic solvent (% by mass) | 30 | 0.8 | 0.5 | 0.6 | 0.7 | 0.7 | 30 | 0 | 15 |
|  | Storage stability | ○ | ○ | ○ | ○ | ○ | ○ | ○ | ○ | X |

Basic compounds: DMEA: N,N-dimethylethanolamine, TEA: triethylamine
Organic solvents: NPA: n-propanol, THF: tetrahydrofuran
Surfactant: EA-190D: Noigen EA-190D
Unit of the surfactant amount: Parts by mass/100 parts by mass of resin solid content
Unit of the organic solvent amount: parts by mass/100 parts by mass of binder Example 7

A rosin ester tackifier (Hariester SK-822E, manufactured by Harima Chemicals, Inc.) was added to the binder "E-5" obtained in Example 5 in such a way that the solid content of the tackifier amounted to 5 parts by mass in relation to 100 parts by mass of the solid content of the binder "E-5". Thus, a binder "E-7" was obtained.

Example 8

The binder "E-2" obtained in Example 2 was placed in a glass sample bottle, the air in the sample bottle was purged with nitrogen, and then the binder "E-2" was irradiated with γ-ray from cobalt-60 as a radiation source at a dose of 25 kGy to yield a binder "E-8".

Example 9

A terpene tackifier (Nano Lett R-1050, manufactured by Yasuhara Chemical Co., Ltd.) was added to the binder "E-2" obtained in Example 2 in such a way that the solid content of the tackifier amounted to 5 parts by mass in relation to 100

TABLE 3

|  |  | Examples | | | |
| --- | --- | --- | --- | --- | --- |
|  |  | 7 | 8 | 9 | 10 |
| Binder |  | E-7 | E-8 | E-9 | E-10 |
| Fed | Polyolefin resin | P-4 | P-1 | P-1 | P-4 |
| composition | Tackifier | SK-822E | — | R-1050 | SK-822E |
|  | Other additive | — | — | — | TAIC |
| Irradiation dose (kGy) |  | — | 25 | 50 | 25 |

Example 11

Production of the Positive Electrode of a Ni-MH Battery

A slurry for electrode formation was prepared as follows; 90 parts by mass of nickel hydroxide powder as an active material and 5 parts by mass of cobalt oxide as a conductive material were mixed together under stirring; then, to the mixture thus obtained, the binder "E-1" was added in such a way that the solid content of the binder "E-1" amounted to 5 parts by mass, and mixed with the mixture under stirring to prepare the slurry for electrode formation. The slurry thus obtained was applied to a foam metal plate as a current collector to be impregnated thereinto, and dried. Thereafter, the foam metal plate thus treated was cut to a predetermined size to fabricate the positive electrode. Additionally, the slurry was subjected to the binding property evaluation.

(Production of the Negative Electrode of a Ni-MH Battery)

A slurry for electrode formation was prepared as follows: 95 parts by mass of a misch metal nickel alloy (AB5 alloy) powder as a hydrogen storage alloy to serve as an active material and 1 part by mass of a nickel powder as a conductive material were used; the binder "E-1" was added to a mixture composed of these powders in such a way that the solid content of the binder "E-1" amounted to 4 parts by mass; and the mixture thus obtained was mixed under stirring to prepare the slurry for electrode formation. The slurry thus obtained was applied to a nickel-plated punching metal plate as a current collector, dried at 80° C., controlled in thickness with a roll press, and then the thus treated plate was cut to a predetermined size to fabricate the negative electrode. Additionally, the slurry was subjected to the binding property evaluation.

(Fabrication of a Ni-MH Battery)

The positive electrode and the negative electrode fabricated as described were wound into a roll in such a way that separators made of a nylon nonwoven fabric were interposed between the positive and negative electrodes, and the assembly of the electrodes and separators was inserted into an AA battery can; and a potassium hydroxide aqueous solution of 31% in terms of the percent by mass concentration was poured into the battery can to fabricate a sealed type cylindrical battery of 1000 mAh in rating capacity. The cycle property of the battery was evaluated.

Examples 12 to 20 and Comparative Examples 4 to 6

As shown in Table 4, in place of the binder "E-1", the binders "E-2" to "E-10" (Examples 12 to 20) and the binders "H-1" to "H-3" (Comparative Examples 4 to 6) were respectively used. Otherwise, by conducting the same operations as in Example 11, the negative electrodes and the positive electrodes of Ni-MH batteries were fabricated, and by using these electrodes, Ni-MH batteries were fabricated. It is to be noted that in each of Comparative Examples 5 and 6, the binding property of the binder was insufficient, and hence no electrodes were able to be fabricated and no evaluation as a battery was conducted.

The evaluation results of the various slurries and batteries in Examples 11 to 20 and Comparative Examples 4 to 6 are shown in Table 4.

TABLE 4

| | | | Examples | | | | | | | | | | Comparative Examples | | |
|---|---|---|---|---|---|---|---|---|---|---|---|---|---|---|---|
| | | | 11 | 12 | 13 | 14 | 15 | 16 | 17 | 18 | 19 | 20 | 4 | 5 | 6 |
| Slurry for positive electrode | Constitution | Active material | Nickel hydroxide | | | | | | | | | | | | |
| | | Conductive material | Cobalt oxide | | | | | | | | | | | | |
| | | Binder | E-1 | E-2 | E-3 | E-4 | E-5 | E-6 | E-7 | E-8 | E-9 | E-10 | H-1 | H-2 | H-3 |
| | Binding property (Ni foil) (N/15-mm width) | | 2.0 | 2.1 | 1.9 | 2.0 | 2.3 | 2.5 | 2.6 | 2.7 | 2.6 | 2.5 | 1.1 | 0.5 | 0.5 |
| Slurry for negative electrode | Constitution | Active material | Misch metal nickel alloy | | | | | | | | | | | | |
| | | Conductive material | Nickel | | | | | | | | | | | | |
| | | Binder | E-1 | E-2 | E-3 | E-4 | E-5 | E-6 | E-7 | E-8 | E-9 | E-10 | H-1 | H-2 | H-3 |
| | Binding property (Ni foil) (N/15-mm width) | | 2.0 | 1.9 | 1.8 | 2.0 | 2.1 | 2.4 | 2.4 | 2.6 | 2.6 | 2.3 | 1.0 | 0.4 | 0.5 |
| Ni-MH battery | Cycle property | | ○ | ○ | ○ | ○ | ○ | ○ | ○ | ○ | ○ | ○ | X | — | — |

Example 21

Production of the Positive Electrode of a Lithium Ion Battery

A slurry for electrode formation was prepared as follows: with 94 parts by mass of lithium cobaltate as an active material and 2 parts by mass of Ketjen black ECP600JD (manufactured by Ketjen Black International Co., Ltd., hereinafter referred to as "D-1") as a conductive material, the binder "E-1" was mixed in such a way that the solid content of the binder amounted to 4 parts by mass; 300 parts by mass of ion-exchanged water was added to the mixture thus obtained and the mixture was stirred; and the mixture was dispersed at a pressure of 200 MPa with a homogenizer-type dispersion treatment apparatus (Genus PY, manufactured by Genus Co., Ltd.) to yield the slurry for electrode formation. The obtained slurry was applied, with a doctor blade, to a sheet of aluminum foil, vacuum-dried and then controlled in thickness with a roll press; and then the thus treated sheet was cut to a predetermined size to fabricate the positive electrode. Additionally, the slurry was subjected to the binding property evaluation.

(Production of the Negative Electrode of a Lithium Ion Battery)

A slurry for electrode formation was prepared as follows: to 92 parts by mass of graphite as an active material and a conductive material, the binder "E-1" was added in such a way that the solid content of the binder amounted to 8 parts by mass; 300 parts by mass of ion-exchanged water was added to the mixture thus obtained and the mixture was stirred; and the mixture was dispersed at a pressure of 200 MPa with the homogenizer-type dispersion treatment apparatus (Genus PY, manufactured by Genus Co., Ltd.) to yield the slurry for electrode formation. The obtained slurry was applied, with a doctor blade, to a sheet of copper foil, vacuum-dried and then controlled in thickness with a roll press; and then the thus treated sheet was cut to a predetermined size to fabricate the negative electrode. Additionally, the slurry was subjected to the binding property evaluation.

(Fabrication of a Lithium Ion Battery)

The individual electrodes obtained as described were wound into a roll in such a way that separators made of polypropylene were interposed between the individual electrodes, and the assembly of the electrodes and separators was inserted into a battery can; and a 1 mol/liter solution of lithium hexafluorophosphate dissolved in a mixed solvent of ethylene carbonate and dimethyl carbonate (1:1 in volume ratio) was poured into the battery can to fabricate a battery.

Examples 22 to 33 and Comparative Examples 7 to 9

As a conductive material, a mixture was prepared by mixing expanded graphite CMX (manufactured by Nippon Graphite Industry Co., Ltd.) and carbon black #4500 (manufactured by Tokai Carbon Co., Ltd.) so as to have a mixing ratio of expanded graphite/carbon black=12/5 (mass ratio), and this mixture was referred to as "D-2". As another conductive material, a mixture was prepared by mixing expanded graphite CMX (manufactured by Nippon Graphite Industry Co., Ltd.), carbon black #4500 (manufactured by Tokai Carbon Co., Ltd.) and carbon nanotube 652512 (manufactured by Sigma-Aldrich Japan K.K.) so as to have a mixing ratio of expanded graphite/carbon black/carbon nanotube=12/4.99/0.01 (mass ratio), and this mixture was referred to as "D-3".

The conductive materials "D-1" to "D-3" are collectively listed in Table 5.

TABLE 5

|  | D-1 | D-2 | D-3 |
|---|---|---|---|
| Conductive material | ECP | CMX/CB = 12/5 (mass ratio) | CMX/CB/CNT = 12/4.99/0.01 (mass ratio) |

ECP: Ketjen black ECP600JD (manufactured by Ketjen Black International Co., Ltd.)
CMX: Expanded graphite CMX (manufactured by Nippon Graphite Industry Co., Ltd.)
CB: Carbon black #4500 (manufactured by Tokai Carbon Co., Ltd.)
CNT: Carbon nanotube 652512 (manufactured by Sigma-Aldrich Japan K.K.)

As shown in Tables 6 and 7, as compared to Example 21, the types of the active material, conductive material and binder were varied. Otherwise in the same manner as in Example 21, the negative electrodes and the positive electrodes of lithium batteries were fabricated and lithium batteries were fabricated by using these electrodes.

The evaluation results of the slurries and the lithium ion batteries in Examples 21 to 33 and Comparative Examples 7 to 9 are shown in Tables 6 and 7. It is to be noted that in each of Comparative Examples 8 and 9, the binding property of the binder was insufficient, and hence no electrodes were able to be fabricated and no evaluation as a battery was conducted.

TABLE 6

|  |  |  | Examples |  |  |  |  |  |  |  |
|---|---|---|---|---|---|---|---|---|---|---|
|  |  |  | 21 | 22 | 23 | 24 | 25 | 26 | 27 | 28 |
| Slurry for positive electrode | Constitution | Active material | Lithium cobaltate | | | | | | | |
|  |  | Conductive material | D-1 | D-1 | D-2 | D-3 | D-2 | D-3 | D-1 | D-1 |
|  |  | Binder | E-1 | E-2 | E-2 | E-2 | E-3 | E-4 | E-4 | E-5 |
|  | Binding property (Al foil) (N/15-mm width) |  | 2.3 | 2.5 | 2.4 | 2.3 | 2.1 | 2.4 | 2.3 | 2.5 |
| Slurry for negative electrode | Constitution | Active material | Graphite | | | | | | | |
|  |  | Conductive material |  |  |  |  |  |  |  |  |
|  |  | Binder | E-1 | E-2 | E-2 | E-2 | E-3 | E-4 | E-4 | E-5 |
|  | Binding property (Cu foil) (N/15-mm width) |  | 4.5 | 4.7 | 4.5 | 4.6 | 4.3 | 4.5 | 4.5 | 4.9 |
| Lithium ion battery | Cycle property |  | ○ | ○ | ○ | ○ | ○ | ○ | ○ | ○ |

Constitution proportions in slurry for positive electrode: Active material/conductive material/binder = 94/2/4 in parts by mass
Constitution proportions in slurry for negative electrode: Active material (doubling as conductive material)/binder = 92/8 in parts by mass

TABLE 7

|  |  |  | Examples |  |  |  |  | Comparative Examples |  |  |
|---|---|---|---|---|---|---|---|---|---|---|
|  |  |  | 29 | 30 | 31 | 32 | 33 | 7 | 8 | 9 |
| Slurry for positive electrode | Constitution | Active material | Lithium cobaltate | | | | | | | |
|  |  | Conductive material | D-1 | D-1 | D-1 | D-1 | D-1 | D-1 | D-1 | D-1 |
|  |  | Binder | E-6 | E-7 | E-8 | E-9 | E-10 | H-1 | H-2 | H-3 |
|  | Binding property (Al foil) (N/15-mm width) |  | 2.7 | 2.6 | 2.7 | 2.8 | 2.7 | 1.3 | 0.5 | 0.4 |
| Slurry for negative electrode | Constitution | Active material | Graphite | | | | | | | |
|  |  | Conductive material |  |  |  |  |  |  |  |  |
|  |  | Binder | E-6 | E-7 | E-8 | E-9 | E-10 | H-1 | H-2 | H-3 |
|  | Binding property (Cu foil) (N/15-mm width) |  | 5.6 | 5.4 | 5.7 | 5.8 | 5.6 | 2.1 | 0.8 | 0.9 |
| Lithium ion battery | Cycle property |  | ○ | ○ | ○ | ○ | ○ | X | — | — |

Constitution proportions in slurry for positive electrode: Active material/conductive material/binder = 94/2/4 in parts by mass
Constitution proportions in slurry for negative electrode: Active material (doubling as conductive material)/binder = 92/8 in parts by mass

Example 34

Production of the Electrode of a Capacitor

A slurry was obtained as follows: to 7 parts by mass of the conductive material "D-1" and 85 parts by mass of a high-purity activated carbon powder (specific surface area: 1500 $m^2/g$, average particle size: 10 μm) as an active material, the binder "E-1" was added in such a way that the solid content of the binder amounted to 8 parts by mass; the mixture thus obtained was placed in a planetary mixer and ion-exchanged water was added to and mixed with the mixture in such a way that the total solid content concentration was 43% by mass; thereafter the mixture was further diluted with ion-exchanged water in such a way that the solid content concentration was 41% by mass; and the mixture was further mixed for 10 minutes to yield the slurry. The obtained slurry was applied, with a doctor blade, to a sheet of aluminum foil, and dried with an air blow dryer at 80° C. for 30 minutes. Thereafter, the sheet was pressed with a roll press to yield the electrode. Additionally, the slurry was subjected to the binding property evaluation.

(Fabrication of a Capacitor)

The electrode produced as described was cut out to prepare two circular plates. The electrode layer sides of the two plates of electrodes were made to face each other and a circular cellulose separator was interposed between the two plates of electrodes. The electrode-separator assembly thus obtained was housed in a stainless steel coin-shaped exterior container provided with a polypropylene packing. An electrolyte was poured into the exterior container in such a way that no air remained in the container, a stainless steel cap was placed on and fixed to the top of the container through the intermediary of the polypropylene packing, and the container was sealed to produce a coin-shaped electric double layer capacitor. As the electrolyte, a solution prepared by dissolving tetraethylammonium tetrafluoroborate in propylene carbonate in a concentration of 1 mol/liter was used.

Examples 35 to 46 and Comparative Examples 10 to 12

As shown in Tables 8 and 9, as compared to Example 34, the types of the active material, conductive material and binder were varied. Otherwise in the same manner as in Example 34, the electrodes of the capacitors were fabricated and capacitors were fabricated by using these electrodes.

The evaluation results of the slurries and the capacitors in Examples 34 to 46 and Comparative Examples 10 to 12 are shown in Tables 8 and 9. It is to be noted that in each of Comparative Examples 11 and 12, the binding property of the binder was insufficient, and hence no electrodes were able to be fabricated and no evaluation as a capacitor was conducted.

TABLE 8

|  |  |  | Examples | | | | | | | |
|---|---|---|---|---|---|---|---|---|---|---|
|  |  |  | 34 | 35 | 36 | 37 | 38 | 39 | 40 | 41 |
| Slurry for electrode | Constitution | Active material | Activated carbon | | | | | | | |
|  |  | Conductive material | D-1 | D-1 | D-2 | D-3 | D-2 | D-3 | D-1 | D-1 |
|  |  | Binder | E-1 | E-2 | E-2 | E-2 | E-3 | E-4 | E-4 | E-5 |
|  | Binding property (Al foil) (N/15-mm width) |  | 4.9 | 4.4 | 4.5 | 4.4 | 4.9 | 5.1 | 5.2 | 5.4 |
| Capacitor | Volume resistivity (Ωcm) |  | 1.0 | 1.0 | 0.3 | 0.2 | 0.3 | 0.5 | 0.6 | 0.3 |
|  | Cycle property |  | ○ | ○ | ○ | ○ | ○ | ○ | ○ | ○ |

Constitution of slurry for electrode: Active material/conductive material/binder for electrode formation = 85/7/8 in parts by mass

TABLE 9

|  |  |  | Examples | | | | | Comparative Examples | | |
|---|---|---|---|---|---|---|---|---|---|---|
|  |  |  | 42 | 43 | 44 | 45 | 46 | 10 | 11 | 12 |
| Slurry for electrode | Constitution | Active material | Activated carbon | | | | | | | |
|  |  | Conductive material | D-1 | D-1 | D-1 | D-1 | D-1 | D-1 | D-1 | D-1 |
|  |  | Binder | E-6 | E-7 | E-8 | E-9 | E-10 | H-1 | H-2 | H-3 |
|  | Binding property (Al foil) (N/15-mm width) |  | 5.5 | 5.4 | 5.6 | 5.8 | 5.7 | 2.0 | 0.8 | 0.7 |
| Capacitor | Volume resistivity (Ωcm) |  | 0.9 | 0.8 | 0.7 | 0.5 | 0.7 | 12 | — | — |
|  | Cycle property |  | ○ | ○ | ○ | ○ | ○ | X | — | — |

Constitution of slurry for electrode: Active material/conductive material/binder for electrode formation = 85/7/8 in parts by mass As can be seen from the results shown in Table 2, in Examples 1 to 5, binders excellent in storage stability were obtained. As is clear from the results shown in Tables 3 and 4 and 6 to 9, in Examples 6 to 46, the slurries obtained by mixing the binders in which polyolefin resins having specific compositions were used with active materials and conductive materials were excellent in the binding properties with various metals, and were able to easily fabricate various electrodes.

Thus, in each of the Ni-MH batteries and the lithium ion batteries obtained by using the afore-mentioned electrodes, excellent cycle property was obtained; additionally, in the capacitors, low volume resistivity and heat degradation resistance were able to be verified.

On the contrary, the binder of Comparative Example 1 contained 5 parts by mass or more of a nonvolatile water-compatibilizing agent. Therefore, in each of Comparative Examples 4, 7 and 10 in which slurries were prepared by using this binder, the nonvolatile water-compatibilizing agent acted on the interface; and consequently these Comparative Examples were poor in binding property, and also suffered from problems involving the cycle property and the heat degradation resistance.

Additionally, in each of the binders in Comparative Examples 2 and 3, the composition of the polyolefin resin as the main component of the binder contained ethylene having two carbon atoms as the unsaturated hydrocarbon and fell outside the range of the present invention; consequently when the binder was mixed with the conductive material and the active material, the binding property became insufficient and no electrode was able to be formed (in each of Comparative Examples 5, 6, 8 and 9).

The invention claimed is:

1. A binder for electrode formation, wherein a polyolefin resin that contains 50 to 98% by mass of at least one of a propylene component and a 1-butene component and 0.5 to 20% by mass of an unsaturated carboxylic acid unit is dispersed together with a basic compound whose boiling point is lower than 250° C. in an aqueous medium, the unsaturated carboxylic acid unit being one of a acrylic acid unit, a methacrylic acid unit, maleic acid unit, maleic anhydride unit, itaconic acid unit, itaconic anhydride unit, aconitic acid unit, aconitic anhydride unit, fumaric acid unit, crotonic acid unit, citraconic acid unit, mesaconic acid unit and an allylsuccinic acid unit;

the basic compound being one of ammonia, triethylamine, N,N-dimethylethanolamine, isopropylamine, aminoethanol, dimethylaminoethanol, diethylaminoethanol, ethylamine, diethyl amine, isobutylamine, dipropylamine, 3-ethoxypropylamine, 3-diethylaminopropylamine, sec-butylamine, propylamine, n-butylamine, 2-methoxyethylamine, 3-methoxypropylamine, 2,2-dimethoxyethylamine, monoethanolamine, morpholine, N-methylmorpholine, N-ethylmorpholine, pyrrole and pyridine, and the basic compound being present in an amount of 0.5 to 3.0 equivalents relative to the unsaturated carboxylic acid unit in the polyolefin resin.

2. The binder for electrode formation according to claim 1, wherein a number average particle size of the polyolefin resin is 1 μm or less.

3. The binder for electrode formation according to claim 1, wherein the polyolefin resin further comprises an ethylene component.

4. The binder for electrode formation according to claim 1, wherein the unsaturated carboxylic acid component of the polyolefin resin is at least one selected from the group consisting of maleic anhydride, acrylic acid and methacrylic acid.

5. The binder for electrode formation according to claim 1, comprising a cross-linking agent and/or a tackifier.

6. The binder for electrode formation according to claim 1, wherein the binder is cross-linked by radiation irradiation.

7. A slurry for electrode formation, comprising the binder for electrode formation according to claim 1, a conductive material and an active material.

8. An electrode formed by using the slurry for electrode formation according to claim 7.

9. A rechargeable battery formed by using the electrode according to claim 8.

10. A capacitor formed by using the electrode according to claim 8.

* * * * *